United States Patent [19]

Dunavan et al.

[11] Patent Number: 4,857,721

[45] Date of Patent: Aug. 15, 1989

[54] OPTICAL DIRECTION SENSOR HAVING GRAY CODE MASK SPACED FROM A PLURALITY OF INTERDIGITATED DETECTORS

[75] Inventors: David S. Dunavan, Norwalk; Rene Abreu, New Fairfield; Stephen Messelt, Roxbury; Edward Siebert, New Fairfield, all of Conn.

[73] Assignee: The Perkin-Elmer Corporation, Norwalk, Conn.

[21] Appl. No.: 174,059

[22] Filed: Mar. 28, 1988

[51] Int. Cl.$^4$ .............................................. G01J 1/20
[52] U.S. Cl. ................... 250/203 R; 356/141
[58] Field of Search ........... 250/203 S, 203 R, 211 K, 250/231 SE; 356/141, 152; 126/425

[56] References Cited

U.S. PATENT DOCUMENTS

| | | | |
|---|---|---|---|
| 3,440,426 | 4/1969 | Bush | 250/203 R |
| 4,315,690 | 2/1982 | Trocellier et al. | 356/152 |
| 4,365,149 | 12/1982 | Falbel | 356/152 |
| 4,593,187 | 6/1986 | Grotts et al. | 356/141 |
| 4,769,546 | 9/1988 | Kniffler et al. | 250/203 R |

FOREIGN PATENT DOCUMENTS 1380144 1/1975 United Kingdom .

Primary Examiner—David C. Nelms
Assistant Examiner—William L. Oen
Attorney, Agent, or Firm—Thomas P. Murphy; Edwin T. Grimes; Paul A. Fattibene

[57] ABSTRACT

Apparatus for detecting and determining the direction of arrival of optical radiation. The apparatus includes a first mask having one or more slit apertures, a binary encoding mask which combines the functions of angle sensing and digitizing using a so-called gray encoding scheme, and interdigitated detector(s) to produce differential electrical signals, and output processing electronics for providing a digital code or word corresponding to the angle-of-arrival of the incident radiation.

13 Claims, 3 Drawing Sheets

OPTICAL DIRECTION SENSOR HAVING GRAY CODE MASK SPACED FROM A PLURALITY OF INTERDIGITATED DETECTORS

FIELD OF THE INVENTION

The invention pertains generally to a device for detecting and finding the direction of a source of optical radiation in the presence of background radiation and, more particularly, to a detection system for providing a digital signal indicative of the angle of the incoming light.

BACKGROUND OF THE INVENTION

Various prior art incidence angle detection systems have hitherto been proposed.

Typically, these systems are relatively complex, expensive and use an analog measurement technique having linear constraints.

In contrast to the prior art, the present invention provides a direction of arrival sensor which utilizes an encoding scheme and detector for providing a plurality of differential signals that are converted into a digital angle-of-arrival word. The interdigitation of the sensing elements improves performance and substantially eliminates local atmospheric perturbations, thereby enabling improved accuracy of sensing of a distant light source. The differential signal approach enables a relative wide dynamic range of operation.

SUMMARY OF THE INVENTION

With reference to FIG. 1, a direction of arrival sensor (10) comprising:

a mask (11) having one or more elongated slit apertures (27);

interdigitated detector (13-20), responsive to the angle of the incoming radiation for providing a plurality of sets of differential signals; and processing electronics (21-24, 82-85) responsive to each set of said differential signals for providing a plurality of digital (bit) signals each being representative of a respective one of said plurality of sets of differential signals;

whereby a plurality of digital signals are provided for comprising a digital angle-of-arrival word indicative of the angle of arrival of the incoming radiation.

Accordingly, it is an object of the present invention to provide a new and improved direction of arrival sensor device.

Another object of the present invention is to provide an interdigitated detector for a light incidence angle detection system.

Another object of the present invention is to provide an improved encoder and detector device.

Another object of the present invention is to provide a detector having an integrated or integral encoding scheme.

Another object of the present invention is to provide an interdigitated detector having an integral gray encoding scheme for sensing the angle of the incoming light and providing a digital signal representative thereof.

BRIEF DESCRIPTION OF THE DRAWINGS

Other objects and advantages of the present invention will be evident from the following detailed description when read in conjunction with the accompanying drawings which illustrate the preferred embodiment of the present invention. Similar reference numerals refer to similar parts throughout.

DESCRIPTION OF THE PREFERRED EMBODIMENTS

Figure 1:
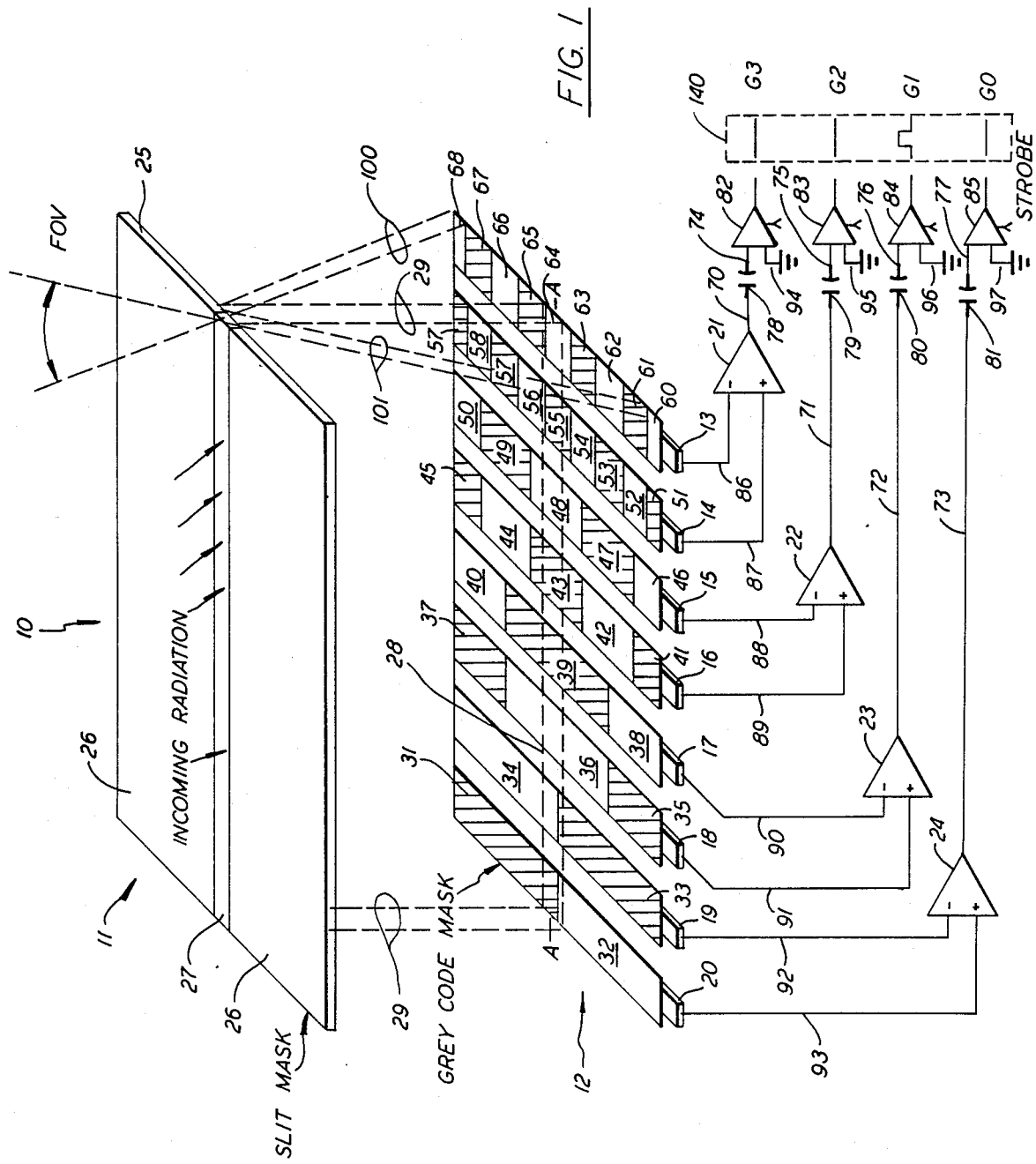
FIG. 1 is a perspective schematic view of an optical direction of arrival sensor in accordance with the invention.

With reference now to FIG. 1, an optical direction of arrival sensor 10 is illustrated. Generally speaking, the optical direction of arrival sensor 10 comprises a top mask 11, an encode or gray code mask 12, a plurality of adjacent parallel detector strips 13-20 and processing electronics 21-24.

Top mask 11 may be formed of any suitable material, for example, a glass or plastic plate 25, and is coated to have an opaque finish 26 with one or more elongate narrow transparent slits 27. Top mask 11 is mounted as the top wall of a housing (not shown) with the gray code mask 12 and detector strips 13-20 mounted within the housing and being spaced from and generally parallel with top mask 11. Slit 27 being aligned perpendicular to a longitudinal axis of the detector strips 13-20 and is aligned along the center transverse axis A—A of encode mask 12. In this manner, radiation originating from a point normal to the surface of the slit mask 11 will be transmitted through slit 27 to the lateral center line of each adjacent detector element in the adjacent strips 13-20.

Thus, a very narrow bar 28 (shown in phantom outline) of irradiation passing through slit 27, as shown by the dashed lines 29, will lie in a transverse direction across encode mask 12.

All discrete detector elements or bars 13-20 are substantially identical in size and shape.

A gray code pattern is provided by opaque masking 12 complimentary sections of alternate detector bars 12. For example, detector bar 20 is masked such that approximately one half, extending from center line A—A to a first end 30, is opaque masked 31, and its other half is coated with a transparent mask 32. Detector bar 19 is similarly divided into two generally equal sections, with its opaque 33 and transparent 34 masked sections being reversed or alternated with respect to the masking of detector bar 20. Detector bar 18 is masked into three sections 35, 36 and 37, with center mask 36 being transparent and end mask 35 and 37 being opaque. Detector bar 17 is also masked into three sections 38, 39 and 40, with center mask 39 being opaque and end mask sections 38 and 40 being transparent. Detector bar 16 is masked to form five sections 41-45, with the center and two end mask sections 43, 41 and 45 being opaque and intermediate mask sections 42 and 44 being transparent. Detector bar 15 is masked to form five sections 46-50, with the center and two end mask sections 48, 46 and 50 being transparent and intermediate mask sections 47 and 49 being opaque. Detector bar 14 is masked to form nine sections 51-59, with the center and two ends and two intermediate mask sections 55, 51, 59, 53 and 57, respectively, being opaque and intermediate mask sections 52, 54, 56 and 59 being transparent. Detector bar 13 is also masked to form nine masked detector sections 60-68, with the center and two end and two intermediate mask sections 64, 60, 68, 62 and 66, respectively, being transparent and intermediate mask sections and intermediate mask sections 61, 63, 65 and 67 being opaque.

The above described pattern represents only one the possible binary code patterns that might be implemented. The pattern may be extended to provide as many pairs of elements as necessary to achieve the required angular resolution for a given application (Number resolution elements=2N, where N=number of pairs of elements and, therefore, the number of bits in an output word).

The processing electronics may comprise a plurality of differential amplifiers 21-24, each with its output 70-73 connected to the input 74-77, via coupling capacitors 78-81, of a comparator 82-85, respectively.

Differential amplifier 21 has its inverting (−) input terminal operatively coupled, via lead 86, to detector 13 and its non-inverting (+) input operatively coupled, via lead 87, to detector 14. Differential amplifier 22 has its inverting (−) input operatively coupled, via lead 88, to detector 15 and its non-inverting (+) input operatively coupled, via lead 89, to detector 16. Differential amplifier 23 has its inverting (−) input operatively coupled, via lead 90, to detector 17 and its non-inverting (+) input operatively coupled, via lead 91, to detector 18. Differential amplifier 24 has its inverting (−) input operatively coupled, via lead 92, to detector 20 and its non-inverting input operatively coupled, via lead 93, to detector 20.

Each comparator 82-85 is operatively coupled to a reference potential such as circuit ground 94-97 and a strobe signal 98 that enables its respective output to indicate a binary zero or binary one.

OPERATION

The basic operation of the optical direction arrival sensor 10, in accordance with the invention, will now be discussed with reference to FIG. 1 and table 1 below. Table 1 is a chart corresponding to detected angles of arrival of incoming radiation and the digital code or word representative thereof.

TABLE 1

| Angle | G0 | G1 | G2 | G3 |
|-------|----|----|----|----|
| +45   | 0  | 0  | 0  | 0  |
| +39   | 0  | 0  | 0  | 1  |
| +33   | 0  | 0  | 1  | 1  |
| +27   | 0  | 0  | 1  | 0  |
| +21   | 0  | 1  | 1  | 0  |
| +15   | 0  | 1  | 1  | 1  |
| +9    | 0  | 1  | 0  | 1  |
| +3    | 0  | 1  | 0  | 0  |
| −3    | 1  | 1  | 0  | 0  |
| −9    | 1  | 1  | 0  | 1  |
| −15   | 1  | 1  | 1  | 1  |
| −21   | 1  | 1  | 1  | 0  |
| −27   | 1  | 0  | 1  | 0  |
| −33   | 1  | 0  | 1  | 1  |
| −39   | 1  | 0  | 0  | 1  |
| −45   | 1  | 0  | 0  | 0  |

For ease of understanding and to avoid prolixity, only a selected number of detected angles of arrival will herein be discussed in detail. It being understood that as the angle of arrival of the incoming radiation or light changes the digital signal will correspondingly change as shown in table 1, over the operational range.

Assuming a substantially collimated source of incoming radiation at approximately a positive three degree angle relative to top mask 11, a narrow beam of light 29 passes through slit 27 and impinges on mask 12 as a transverse strip of light 28.

With light beam 29 passing through transparent mask sections 64 and 48, and being blocked by opaque mask sections 55 and 43, detectors 13-16 provide signals at the inputs of differential amplifiers 21 and 22, which effect a binary or digital bit code of zero (0) and zero (0) at the G3 and G2 outputs of comparators 82 and 83, respectively, with a strobe pulse/signal 98 being applied to the comparators. Beam 28 is blocked by opaque mask section 39 and transmitted by transparent mask section 36, which causes detectors 17 and 18 to provide a no signal and a signal condition at the inverting and non-inverting input, respectively of differential amplifier 23. This, in turn, effects a digital (1) one code being generated at the G1 output of comparator 84, with a strobe pulse 98 at comparator 84. At the positive (+) three degree angle as illustrated in FIG. 1 for beam strip 28, it can be seen that substantially more light radiation/energy is impinging on transparent mask section 34 than on transparent mask section 32, which results in a greater signal being provided at the inverting (−) input than is provided at the non-inverting (+) input of differential amplifier 24. This, in turn, effects a digital (0) zero (bit) code being provided during strobe pulse 98 at the G0 output of comparator 85.

The G0-G3 output signals, i.e., a four bit digital code, comprise a digital word being representative of the angle of the detected incoming radiation as shown in FIG. 1.

With periodic application of strobe pulse 98, a series of digital words may be generated for tracking the relative positions between the optical direction of arrival sensor, for example, on an airplane, and the generating source of the incoming radiation.

With reference to beams 100 and 101, a positive/negative 45 degree angle of arrival from normal is depicted. At the angles, digital bits 0000 and 1000 are generated, during a respective strobe pulse period, by comparators 82-85.

It should be readily understood from the above that the gray code masked 12 detectors 13-20 produce a distinctive digital angle-of-arrival word 140 with each 6 degree change of the angle of the incoming laser beam, e.g., "0100" at a +3 degree angle and "0101" at a +9 degree angle (see table 1). Different degrees of resolution may be effected with change of the grey code mask 12 and/or slit 27 dimension.

Figure 1A:
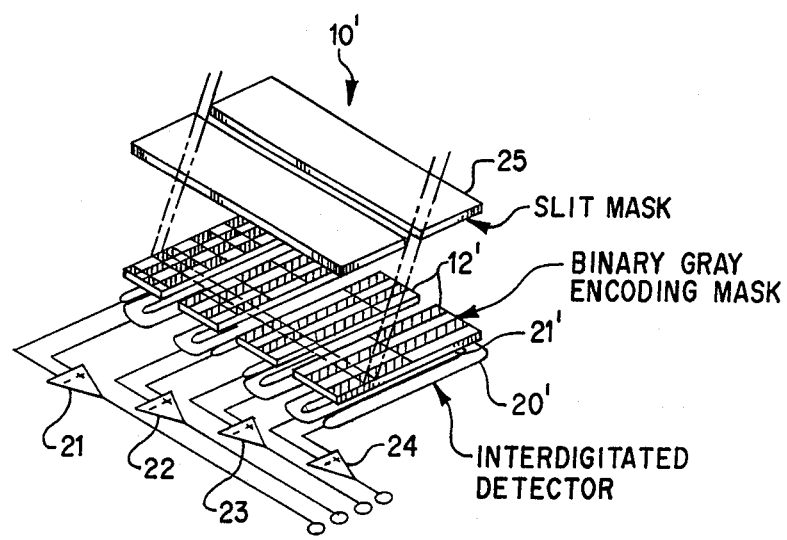
FIG. 1A is a perspective view of another embodiment of the invention illustrating the interdigitated detectors.

It should now also be appreciated that the present invention is relatively more accurate and operates substantially over a much wider range of optical intensities. The differential signals from adjacent paired detectors 13-14 and 15-16 and 17-18 and 19-20, enables a relatively wide dynamic range of operation. The interdigitation of the sensing elements 20' and 21', illustrated in FIG. 1A, further improves the relative performance of the optical direction of arrival sensor, while substantially eliminating local atmospheric perturbations. In this manner, a difference signal is utilized from matched pairs of sensing (detector) elements, thereby, substantially or virtually desensitizing sensor to large variations in background (ambient) light and incoming radiation source intensities, resulting in a substantially more accurate sensor device over the prior art. Modified gray code mask 12' covers the detectors 20' and 21' analogously to the gray code mask 12 illustrated in FIG. 1.

Figure 2:
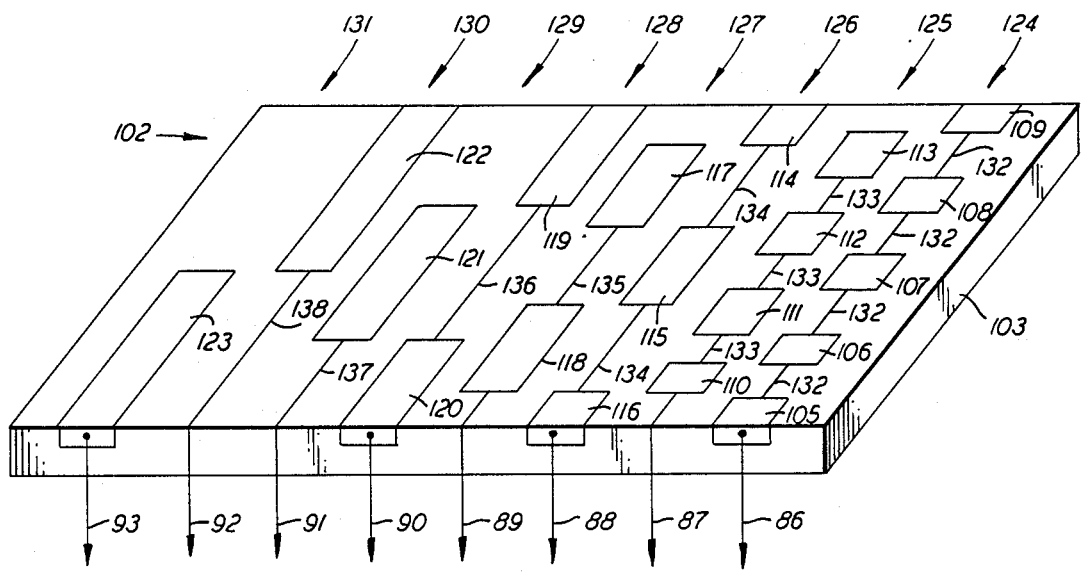
FIG. 2 is a perspective schematic view of another embodiment of the detector having an integral encoding scheme in accordance with the invention.

Referring now to FIG. 2, an alternative embodiment of the masked detector 12-20, as shown in FIG. 1 is illustrated. All other components and operation remain basically the same. Detector 102 comprises a silicon wafer 103 doped, for example, to from an "N-type" substrate and a plurality of "P-type" regions 105-123. The "P-type" regions 105-123 are arranged in an interdigitated code, for example, a gray code. Each sensor (P-type) region 105-109, 110-113, 114-116, 117-118, 119-120, 122 and 123 aligned in a column 124-131 is electrically interconnected by, for example, a connector 132-138 to circuit lead 86-92, respectively. Sector 123 may be directly connected to circuit lead 93. Thus, each detector consists of an N-type silicon wafer with a P-type diffused pattern. No active detector regions are blocked out or shaded thereby reducing overall detector noise. In this manner, a gray code pattern is formed as an intergrated P-N junction pattern on the detector substrate or wafer, thereby eliminating the need for a separate mask encoding and substantially minimizing leakage current.

Figure 3:
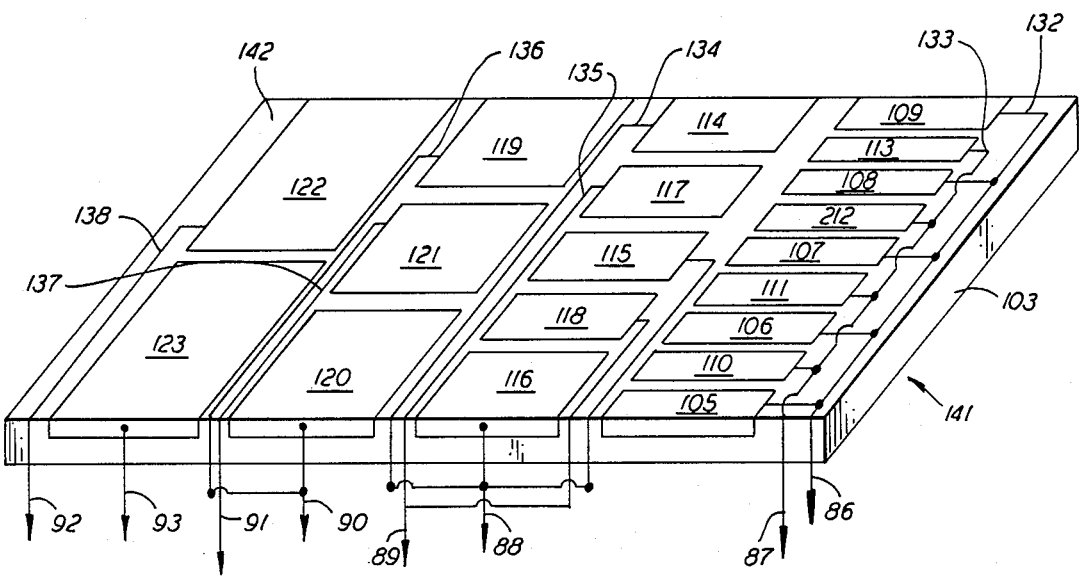
FIG. 3 is a perspective schematic view of another embodiment of the detector having an integral encoding scheme in accordance with the invention.

It should be appreciated with reference to FIG. 3 that detector array 141 provides interdigitation of detector regions 105-123 to effect a substantial elimination of wasted or not utilized surface 142 of substrate 103 relative to the encoding pattern layout as shown in FIG. 2. In this manner improved efficiency may be achieved over the detector arrangements illustrated in FIGS. 1 and 2.

It is to be understood that the above described embodiments are illustrative of the application of the principles of the present invention. Other arrangements may be devised by those skilled in the art without departing from the spirit and scope of the claimed invention.

The number of bits in the output word may be varied to provide the resolution desired and the encoder pattern may be varied as desired so long as the resulting sequence of output words conform to a gray code sequence; ie., when the output changes from one state to a state indicating an immediately adjacent resolution element only one bit in the output word changes.

What is claimed is:

1. A direction of arrival sensor having particular utility for detecting and determining the angle of incoming radiation comprising:
   a slit mask having at least one narrow transparent slit;
   a plurality of detector elements spaced from said slit mask and being responsive to incoming radiation passing through said transparent slit; said plurality of detector elements forming pairs of first and second detector combinations;
   differential means, coupled to each of said pairs of said first and second detector combinations, for providing an output signal indicative of the difference between the two input signals from said first and second detector combinations; and
   means, responsive to said differential means, for providing a digital signal indicative of the angle of incidence of the incoming radiation.

2. A direction of arrival sensor as in claim 1, wherein:
   the slit mask is an opaque planar mask, and said narrow transparent slit being straight and in the opaque plane of said slit mask.

3. A direction of arrival sensor as in claim 1, wherein:
   the plurality of detector elements comprises a plurality of adjacent identical detector elements in a plane parallel with and spaced from said slit mask, the longitudinal axis of each of said plurality of elements being parallel with each other and perpendicular to said transparent slit, and a corresponding plurality of encoding masks each comprising one or more transparent mask sections and one or more opaque mask sections formed on the surface of a respective one of said plurality of detector elements for effecting an interdigitated detector for providing said two signals.

4. A direction of arrival sensor as in claim 1, wherein:
   the plurality of detector elements comprises an encode pattern formed as a plurality of integrated P-N junctions on a silicon wafer, or photo sensitive regions in any other type of light or infrared sensing device.

5. A direction of arrival sensor as in claim 1, wherein:
   said differential means comprises a plurality of differential amplifiers each having a first and a second input each operatively coupled to a respective one of said detector elements in said pairs of said first and second detector combinations and an output operatively coupled to the input of a comparator circuit.

6. A direction of arrival sensor, comprising:
   a mask (11) having one or more elongate slit apertures (27);
   a plurality of interdigitated detector elements (13-20, or 105-123) responsive to the angle of an incoming radiation for providing a plurality of groups of differential signals; and
   processing means (21-24, 82-85) being responsive to each set of said differential signals for providing a plurality of digital signals each being representative of a respective one of said plurality of sets of differential signals;
   whereby a plurality of digital signals being provided for comprising a digital angle-of-arrival word indicative of the angle of incidence of the incoming radiation.

7. A detector for determining the angle of incidence of incoming radiation, comprising:
   an opaque planar slit mask having at least one narrow transparent straight slit in the opaque plane of said mask;
   a detector array in a plane parallel with and spaced from said planar slit mask, and having a plurality of adjacent substantially identical paired detector elements with their longitudinal axis being parallel with each other and perpendicular to said transparent slit;
   a gray code mask intermediate said slit mask and said detector array, said gray code mask means having a plurality of transparent mask sections and a plurality of opaque mask sections for effecting the encoding of said detector array;
   an output circuit having a plurality of differential amplifier circuits each having a first and a second input terminal and an output terminal, each of said first and second input terminals being operatively coupled to a respective one of an interdigitated adjacent pair of said detector elements, said output terminal of each of said differential amplifiers being operatively coupled to a respective one of a plurality of comparator circuit means, each of said differential amplifier circuits being responsive to a pair of signal outputs from a respective pair of said detector elements for generating a respective difference signal output, each of said comparator circuit means being responsive to a respective one of said difference signal outputs for generating a respective binary coded signal.

8. A detector for determining the angle of incidence of incoming radiation, comprising:

an opaque planar slit mask (11) having at least one narrow transparent straight slit (27) in the opaque plane of said mask;

detector means (102) spaced from and in a plane substantially parallel with said planar slit mask, said detector means having a first type semiconductor wafer (103) and a plurality of second type semiconductor regions (105-123), each said second type semiconductor regions being in electrical contact with said first type semiconductor wafer forming a plurality of P-N junction detectors arranged in a predetermined encode pattern each being responsive to an incidence of the incoming radiation thereon for generating a signal, and circuit means (21-24, 82-85) operatively coupled to said P-N junction detectors and being responsive to said signals for providing a digital angle-of-arrival word indicative of the angle of the incoming radiation relative to said planar slit mask.

9. A detector as in claim 8, wherein:

the first type semiconductor wafer comprises N-type semiconductor silicon material;

the second type semiconductor regions comprise P-type semiconductor silicon material, said second type semiconductor regions forming a so-called gray code pattern.

10. A detector as in claim 8, wherein:

the P-N junction detectors being paired to provide a plurality of sets of paired signals;

the circuit means comprises a plurality of amplifiers (21-24) each being responsive to a respective set of said paired signals for providing a difference signal output, and having a plurality of comparator circuit means (82-85) each being responsive to a respective one of said difference signals for providing a respective binary code signal representative of the respective difference signal, whereby a plurality of binary code signals being periodically provided comprising a digital angle-of-arrival word indicative of the angle of incidence of the incoming radiation on said detector means (102) relative to said slit (27).

11. A direction of arrival sensor for determining the angular direction of radiation comprising:

a plurality of radiation detectors positioned in elongated groups forming detector pairs of first and second detector combination;

a slit mask having a transmissive slit therein positioned over said plurality of radiation detectors;

differential means, coupled to each of said detector pairs, for subtracting the output of said first detector combination from the output of said second detector combinations; and comparator means, coupled to the output of said differential means, for providing a digital code based on the output of said differential means.

12. A direction of arrival sensor as in claim 11 wherein:

said detector pairs are interdigitated.

13. A direction of arrival sensor as in claim 11 wherein;

said plurality of detectors are arranged in a gray code pattern.

* * * * *

UNITED STATES PATENT AND TRADEMARK OFFICE
CERTIFICATE OF CORRECTION

PATENT NO. : 4,857,721

DATED : August 15, 1989

INVENTOR(S) : Dunavan et al

It is certified that error appears in the above-identified patent and that said Letters Patent is hereby corrected as shown below:

Column 4, line 62, after "sensor", insert --10'--

Column 4, line 66, after "sensor", insert --10'--

Signed and Sealed this

Twenty-fourth Day of November, 1992

Attest:

DOUGLAS B. COMER

*Attesting Officer*   Acting Commissioner of Patents and Trademarks